INVENTOR.
CLAIR L. FARRAND
BY
W. E. Beatty
ATTORNEY

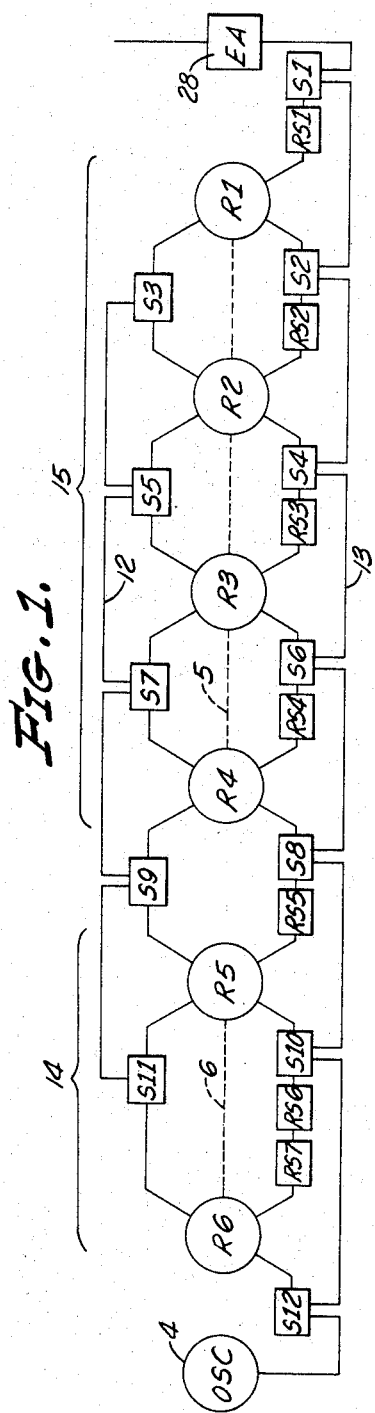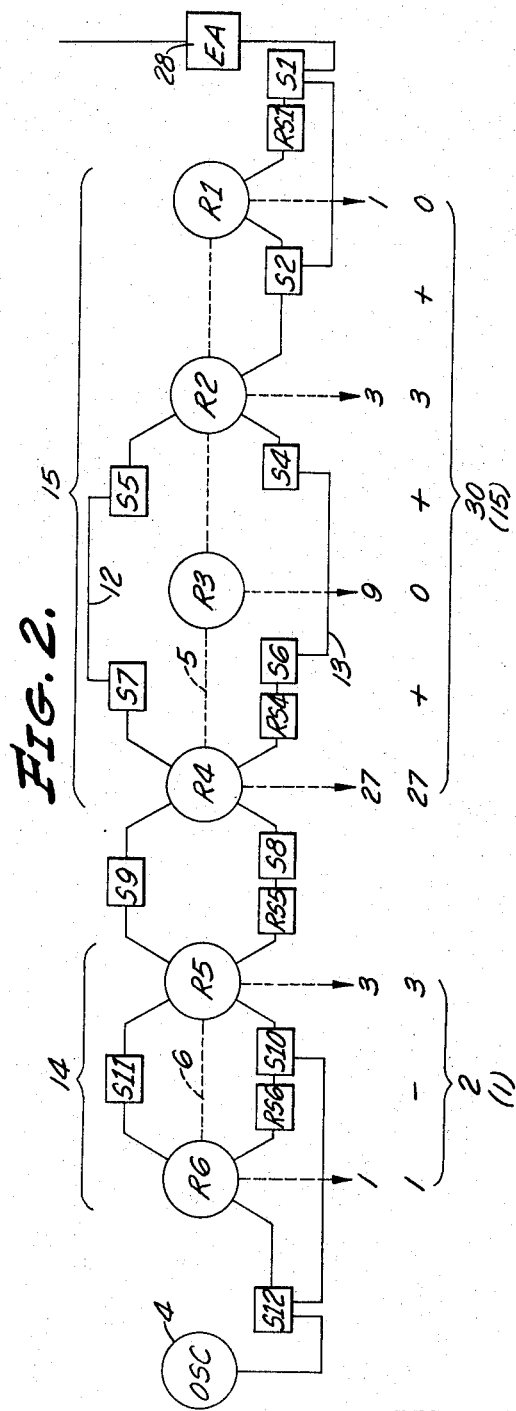

United States Patent Office 3,373,326
Patented Mar. 12, 1968

3,373,326
POSITION MEASURING TRANSFORMER SYSTEM FOR MULTIPLE SHAFT SYNCHRONIZATION
Clair L. Farrand, Bronxville, N.Y., assignor to Inductosyn Corporation, Carson City, Nev., a corporation of Nevada
Filed June 25, 1964, Ser. No. 377,874
12 Claims. (Cl. 318—18)

ABSTRACT OF THE DISCLOSURE

Rotary position measuring transformers such as resolvers, selsyns and Inductosyns (trademark) and others have been used with relatively movable members having two or more poles. With two poles, one cycle of the coupling wave is produced between the windings of the members for each revolution. This has been designated a one-speed field. When a plurality of poles are used, such as, for example, fifty-four poles, producing twenty-seven cycles of the coupling wave per revolution, this has been designated a twenty-seven-speed device. Hence, speed as applied to a position measuring transformer represents the number of cycles of coupling wave per revolution.

---

A twenty-seven-speed transformer mounted on a one-speed shaft geared to a twenty-seven-speed shaft on which is mounted a one-speed transformer will have coupling waves which are in synchronism. These transformers may be connected in tandem, and zeroed, and their resulting error signal of this combination employed to servo the shafts into an accurate ratio of shaft speed.

The position measuring transformers may be connected in different combinations to provide different speed ratios for the two shafts, as well as any one of a number of speeds for each shaft.

The invention relates to a position measuring transformer system for multiple shaft synchronization.

An object of the invention is to provide a system for accurately synchronizing two or more shafts of a machine at any one of many selected predetermined ratios of speed.

A further object of the invention is to provide a machine for generating gears of high accuracy.

Rotary position measuring transformers such as resolvers, selsyns and Inductosyns (trademark) and others have been used with relatively movable members having two or more poles. With two poles, one cycle of the coupling wave is produced between the windings of the member for each revolution. This has been designated a one-speed field. When a plurality of poles are used such as, for example, fifty-four poles, producing twenty-seven cycles of the coupling wave per revolution, this has been designated a twenty-seven-speed device. Hence, speed as applied to a position measuring transformer represents the number of cycles of coupling wave per revolution.

A twenty-seven-speed transformer mounted on a one-speed shaft geared to a twenty-seven-speed shaft on which is mounted a one-speed transformer will have coupling waves which are in synchronism. These transformers may be connected in tandem and zeroed and their resulting error signal of this combination employed to servo the shafts into synchronization, establishing an accurate ratio of shaft speed.

According to the invention, the position measuring transformers may be connected in different combinations to provide different speed ratios for the two shafts, as well as any one of a number of speeds for each shaft.

A comparatively small number of position measuring transformers are arranged to provide a larger number of different speeds, or speed ratios. A feature of the invention is the provision of a small number such as four position measuring transformers having speeds which vary according to successive powers of three (tertiary system), switches being provided for connecting these transformers in different combinations for producing a large number of speeds such as forty different speeds from 1 to 40. The rotors of these transformers are mounted on one shaft. A smaller number of position measuring transformers, such as two for example, have rotors mounted on the other shaft, these transformers having speed which also vary according to powers of three, switches being provided for connecting these two transformers in different combinations to provide four different speeds. As described above, in the case of the twenty-seven-speed transformer, the transformers of one shaft may be connected in tandem with the transformers of the other shaft, the two sets of transformers being zeroed and their resultant error signal employed to servo the shafts to an accurate ratio of shaft speed.

A variable speed position measuring transformer system wherein the transformers have rotors on one shaft, the transformers having a progressively varying number of cycles of coupling wave per revolution with switching means for connecting the transformers in different combinations, is described and claimed in copending application S.N. 377,873, filed June 25, 1964 by applicant for Variable Speed Position Measuring Transformer System, the present application being directed to the use of such variable speed system for multiple shaft synchronization.

For further details of the invention reference may be made to the drawings wherein:

FIG. 1 is a schematic showing of a position measuring transformer system with switches for connecting the transformers in different combinations to provide a number of different speed ratios for two shafts, according to the invention.

FIG. 2 is a schematic showing of the system of FIG. 1, illustrating a typical example wherein the speed of the transformer combination for one shaft is related to the transformer combination for the other shaft in the ratio of 1 to 15 to maintain these shafts in the inverse speed ratio of 15 to 1.

Figure 3:
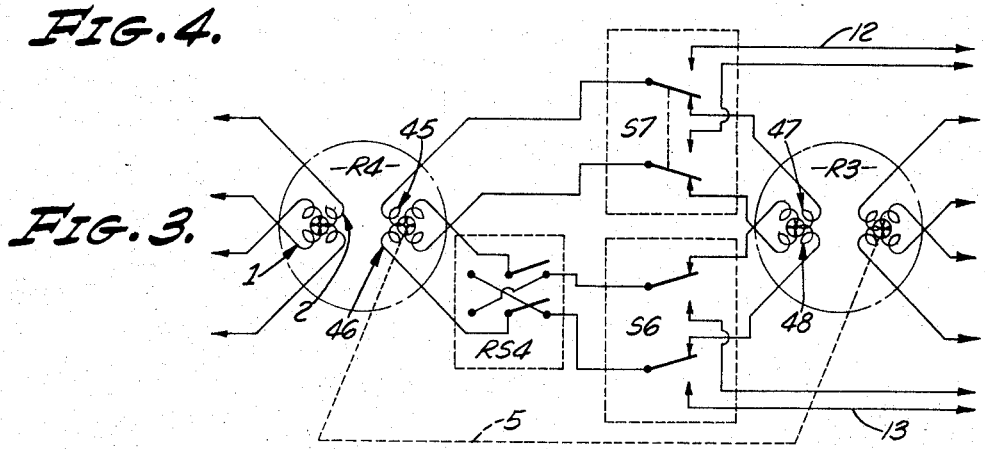

FIG. 3 is a detailed showing of three switches employed between adjoining transformers in FIGS. 1 and 2, one switch being employed to reverse the input to one phase of the succeeding transformer and the other switches being employed to bypass a particular transformer or connect the transformers in tandem, the resultant transformer speed being the algebraic sum of the speeds of the individual transformers.

Figure 4:
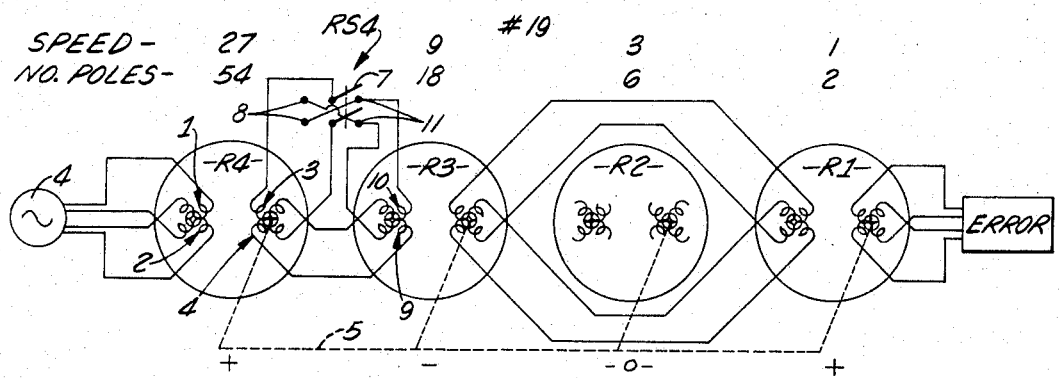

FIG. 4 is a schematic showing of the transformers associated with one of the shafts in FIGS. 1 and 2, illustrating a typical connection of the transformers to obtain a particular one of a large number of possible transformer speeds for the shaft.

Figure 5:
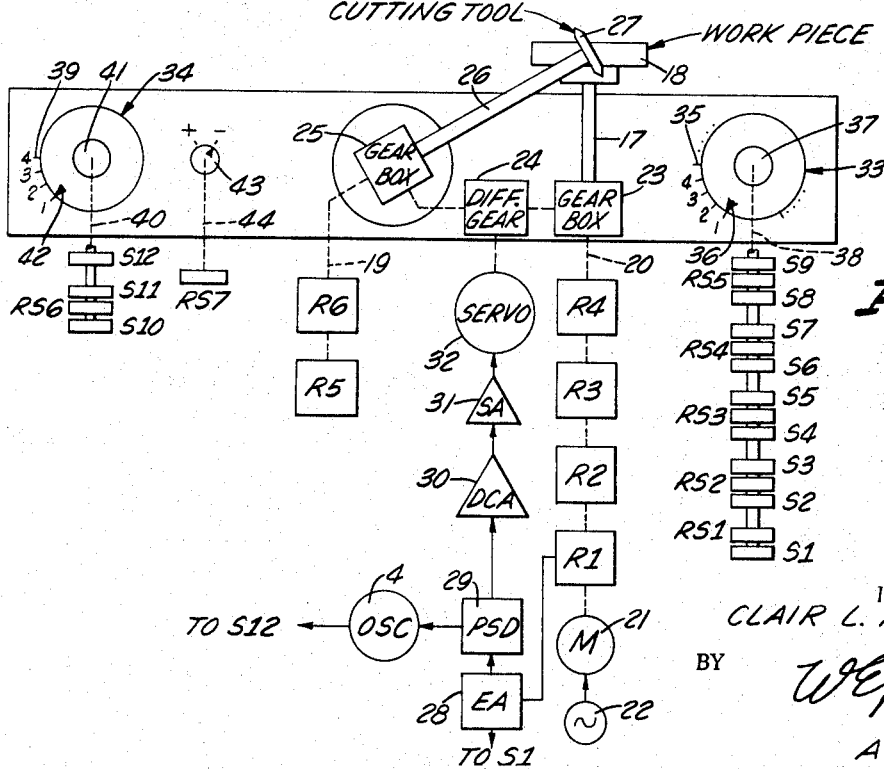

FIG. 5 is a schematic showing of a machine for cutting gears employing the system for the other figures for obtaining any one of a number of accurate ratios of shaft speed.

Referring in detail to the drawings, FIG. 1 is a simplified version of the system of FIG. 5. The items R1 to R6 represent position measuring transformers whereof R3 and R4 also appear in FIG. 3. Each position measuring transformer R1 to R6 has a polyphase input winding, two windings 1, 2 being indicated in FIG. 3, with polyphase output windings 45, 46. If there are two phases, as indicated in FIG. 3, the windings 1 and 2 would be in space quadrature of the pole cycle of the polyphase windings 45, 46, and the oscillator input 4 in FIGS. 1, 2, 4 and 5 would supply sine and cosine inputs, as well known.

The position measuring transformers employed in the system of the present invention may be resolvers with two phase input and output windings as indicated at 23 FIG. 1 of Patent 2,950,427 dated Aug. 23, 1960. These resolvers may have more than two phases and may embody the improvements described and claimed in Patent 2,799,835, dated July 16, 1957.

As shown in FIGS. 1–4, the transformers R1 to R4 have rotors mounted on one shaft 5 and transformers R5 and R6 have rotors mounted on another shaft 6. These shafts are shown at 20 and 19 in FIG. 5.

In FIGS. 1 and 2, the transformers R5 and R6 associated with shaft 6 may be referred to as a group or series 14 of transformers while the transformers R1 to R4 associated with shaft 5 may be referred to as a group or series 15, selector switching means S1 to S12 being provided for connecting any one or more of the transformers in group 14 in tandem with any one or more of the transformers in group 15, or for bypassing the output to a line like 12, 13, in FIG. 3, switching means RS1 to RS6 being provided for reversing one phase of the polyphase output from each of the six resolvers R1 to R6. A typical detail of these reversing and selector switches is shown in FIG. 3 between transformers R3 and R4. When the blades 7 of switch RS4 connect with contacts 8, the output winding 46 of R4 is connected in one sense to one phase 48 of the input winding of R3. In the alternate position, when blades 7 are connected to contacts 11, the input from winding 46 is connected in the reverse sense to winding 48. Switches S6 and S7, in the position shown in FIG. 3, connect R4 in tandem with R3, the windings 45, 46 of R4 being connected to supply inputs to the polyphase windings 47, 48 respectively of R3. R3 is bypassed when S6, S7 are in the alternate position, the output of R4 being connected to line 12, 13.

As shown in FIGS. 2 and 4, the speed of transformers R1 to R4 increases from right to left in accordance with powers of three, R1 having a speed of 1, R2 having a speed of 3, R3 having a speed of 9 and R4 having a speed of 27. In this case, the number of poles of R1 to R4 would be respectively 2, 6, 18, 54.

Referring to FIG. 2, in the group 14, R6 with speed of 1 is connected in tandem with R5 and with switch RS6 operated to reverse the input of one phase of R5 whereby the resultant speed is 1−3=2. In the group 15, R4 is connected in tandem with R2, whereas R3 and R1 are bypassed, whereby the resultant speed is 27+3 or 30. The ratio of transformer speed of group 14 to group 15 is 2 to 30 or 1 to 15.

The following table shows that transformers R1 to R4 with these speed values make it possible to obtain a sequence of resultant speeds from 1 to 40. This table also shows a speed value 81 for a fifth transformer, not shown, indicating only the additional resultant speed 41, whereas it is obvious that the transformer of speed 81 may be combined with the other four transformers to provide a total of 1+3+9+27+81 equals 121 resultant speeds.

TABLE

| Number of poles | 2 | 6 | 18 | 54 | 162 |
|---|---|---|---|---|---|
| Speed of Individual Resolvers | 1 | 3 | 9 | 27 | 81 |
| Resultant Speed: | | | | | |
| 1 | + | | | | |
| 2 | − | + | | | |
| 3 | | + | | | |
| 4 | + | + | | | |
| 5 | − | − | + | | |
| 6 | | − | + | | |
| 7 | + | − | + | | |
| 8 | − | | + | | |
| 9 | | | + | | |
| 10 | + | | + | | |
| 11 | − | + | + | | |
| 12 | | + | + | | |
| 13 | + | + | + | | |
| 14 | − | − | − | + | |
| 15 | | − | − | + | |
| 16 | + | − | − | + | |
| 17 | − | | − | + | |
| 18 | | | − | + | |
| 19 | + | | − | + | |
| 20 | − | + | − | + | |
| 21 | | + | − | + | |
| 22 | + | + | − | + | |
| 23 | − | − | | + | |
| 24 | | − | | + | |
| 25 | + | − | | + | |
| 26 | − | | | + | |
| 27 | | | | + | |
| 28 | + | | | + | |
| 29 | − | + | | + | |
| 30 | | + | | + | |
| 31 | + | + | | + | |
| 32 | − | − | + | + | |
| 33 | | − | + | + | |
| 34 | + | − | + | + | |
| 35 | − | | + | + | |
| 36 | | | + | + | |
| 37 | + | | + | + | |
| 38 | − | + | + | + | |
| 39 | | + | + | + | |
| 40 | + | + | + | + | |
| 41 | − | − | − | − | + |

In FIG. 2, R3 is indicated as having a speed of 3 and R6 a speed of 1, giving a total of resultant speeds from 1 to 4.

The number of transformers in groups 14 and 15 may be varied from a minimum of 1 to a maximum of any desired number. The speed ratio of the transformers in a group may vary progressively in accordance with some system other than the tertiary system illustrated in the drawings and table, but this tertiary system is preferred as it is possible to obtain 40 different transformer speeds with the use of only four transformers.

FIG. 4 is a typical example of the various switches operated so as to obtain a resultant speed of 19 from the transformers R1 to R4. The table shows that 19 is 1+27−9, 3 being 0. This is carried out in FIG. 4 wherein R4 supplies an input to R3, reversing switch RS4 reversing the input to winding 47 of one phase of R3 which supplies its output to the input of R1, bypassing R2. The speed and number of poles of R1 to R4 is indicated below each transformer in FIG. 4.

A further example of a desired ratio of the speed of shaft 5 with respect to shaft 6 is shown in FIG. 2. The first line of figures below FIG. 2 indicates the transformer speed of each transformer R1 to R6. The second line of figures shows whether the transformer speed of each transformer is plus or minus or zero. The two lowest lines at the bottom of FIG. 2 show that in the example here illustrated, the group 15 has a resultant speed of 30, the group 2 having a resultant speed of 2. The ratio of these two transformer speeds appears in the bottom line in FIG. 2 as (1) and (15). If the ratio of the speed of shaft 5 to the speed of shaft 6 is the inverse of their resultant transformer speed, with the transformers of the two groups connected in tandem and zeroed, the error current may be employed to control a servo drive to maintain the desired speed ratio between these shafts. A system for accomplishing this for the purpose of gear cutitng is shown in FIG. 5 wherein transformers R1 to R6 are the same as indicated in the other figures. Transformers R1 to R4 have rotors on a shaft 20 driven by motor 21 having a power source 22. Shaft 20 is connected through gear box 23 with shaft 17 of a machine tool for driving a gear blank or work piece 18. Transformers R5 and R6 have rotors on a shaft 19 connected through gear box 25 to a shaft 26 which drives the cutting tool 27. The error current from amplifier EA28 from switch S1 in FIGS. 1 and 2 supplies a phase sensitive detector 29 having an input from oscillator 4 connected to switch S12 in FIG. 1. PSD29 supplies a DC amplifier 30 which supplies an input to servo amplifier 31 which feeds a servomotor 32 which drives a differential gear 24 which changes the ratio of drive of shaft 17 to shaft 26 to reduce the error current to zero and maintain these shafts at the desired accurate speed ratio which is the inverse of their respective resultant ratio of transformer speed.

Referring again to FIG. 5, a manual control 33 is provided for varying the speed of shaft 17 and a manual control 34 is provided for varying the speed of shaft 26. Control 33 includes a scale 35 with calibrations from 1 to 40 representing the resultant transformer speed of the transformer R1 and R4. An associated index 36 for a knob 37 on shaft 38 indicates activation of the relevant switches RS1 to RS5 and S1 to S9. These switches may be arranged in groups, as shown, to correspond to their location in the circuit of FIG. 1. Similarly, control 34 includes a scale 39 calibrated from 1 to 4 to represent the resultant transformer speed of R5 and R6. Shaft 40 has a knob 41 and cooperating index 42. Shaft 40 controls activation of switch RS6 and switches S10 to S12 which are associated with R and R6, as shown in FIG. 1.

Reversing switch RS7 in FIGS. 1 and 5 may be employed to reverse or select the polarity of the output of the error amplifier EA28 in relation to the phase sensitive detector 29. As shown in FIG. 5, RS7 may be controlled by a knob 43 on shaft 44.

By operating the knobs 37 and 41, any one of a large number of speed ratios may be selected for the shafts 17 and 26. The selected speed ratio of the shafts is accurately maintained by servomotor 32 which operates differential gear 24 to maintain the desired speed ratio under control of the error current from EA28 in the output of the tandem connected position measuring transformers including one or more of R1 to R4 and one or more of R5 and R6.

The error current is substantially zero when the shafts are running at the accurate speed ratio. At this time, $S_1 \times s_1 = S_2 \times s_2$ where $S_1$ and $S_2$ represent the speeds of shafts, $s_1$ and $s_2$ representing the respective transformer speeds. While a servo is shown as a utilization device, the error current may be utilized in other ways, for example for indicating the speed relation of the shafts or for effecting a desired control.

Various other modifications may be made in the invention without departing from the spirit of the following claims.

I claim:

1. A position measuring transformer system comprising a first shaft having thereon a plurality of rotors of a plurality of first position measuring transformers each having a stator and windings, one winding of each transformer being a polyphase winding, a second shaft having thereon a plurality of rotors of a plurality of second position measuring transformers each having a stator and windings, one winding of each of said last-mentioned transformers being a polyphase winding, means for driving said shafts in timed relation, a source of electrical oscillations for developing coupled waves for the windings of the rotor and stator of each of said transformers, means for connecting said polyphase windings of the tarnsformers for said first shaft in circuit with the polyphase windings of the transformers for said second shaft for developing an output signal from said polyphase windings as a function of the difference between the product of the speed of the first shaft and the number of cycles of coupling wave per revolution of the rotors of the first transformers and the product of the speed of the second shaft and the number of cycles of coupling wave per revolution of the rotors of the second transformers, and separate switching means for connecting the transformers of each shaft in different combinations to provide different speed ratios in timed relation between said shafts.

2. A position measuring transformer system according to claim 1 and a servomotor responsive to said output signal for controlling said driving means for controlling the speed ratio of said shafts.

3. A variable speed position measuring transformer system for multiple shaft operation in timed relation comprising a plurality of shafts including a first shaft having thereon the rotor means of a first position measuring transformer means having a stator means and windings one of which is a polyphase winding, a second shaft having thereon the rotor means of a second position measuring transformer means having a stator means and windings one of which is a polyphase winding, gearing between said shafts for operating said shafts at a certain speed ratio, the ratio of the number of cycles of coupling wave per revolution of said first transformer means to the corresponding number of cycles of said second transformer means being the inverse of the ratio of the speed of said first shaft to said second shaft, a motor for driving one of said shafts and for driving the other shaft through said gearing, the polyphase windings of said first and second transformer means being connected in circuit and having an input circuit and an output circuit, an A.C. supply obtained from an oscillator applied to said input circuit, said output circuit having an error signal substantially equal to the difference between the product of $S_1$ and $s_1$ on the one hand and product of $S_2$ and $s_2$ on the other hand where $S_1$ and $S_2$ represent the speeds of said first and second shafts and $s_1$ and $s_2$ represent respective transformer speeds of said first and second position measuring transformer means, the transformer speed being represented by the number of cycles of coupling wave per revolution of the respective transformer means, and a servomotor controlling means for changing the ratio of said gearing under control of said error signal.

4. A variable speed position measuring transformer system according to claim 3, one of said position measuring transformer means comprising a series of rotary position measuring transformers whereof the number of cycles of coupling wave per revolution increases progressively.

5. A variable speed position measuring transformer system according to claim 4, and switching means for connecting the transformers of the series in different combinations to provide selected ratios of speed between said shafts.

6. A variable speed position measuring transformer system according to claim 3, each of said position measuring transformer means comprising a series of rotary position measuring transformers whereof the number of cycles of coupling wave per revolution increases progressively.

7. A variable speed position measuring transformer system according to claim 3, one of said position measuring transformer means comprising a series of rotary position measuring transformers whereof the number of cycles of coupling wave per revolution increases progressively, switching means for selectively connecting a desired number of the transformers of said series in tandem and for bypassing the remainder, and other switching means for reversing the terminals of certain of said tandem connected transformers.

8. A variable speed position measuring transformer system according to claim 3, each of said position measuring transformer means comprising a series of rotary position measuring transformers whereof the number of cycles of coupling wave per revolution increases progressively, separate switching means for selectively connecting a desired number of the transformers of each of said series in tandem and for bypassing the remainder, and other separate switching means for reversing the terminals of certain of the tandem connected transformers of each series.

9. A position measuring transformer system comprising a first shaft having thereon the rotor of a first position measuring transformer having a stator and windings one of which is a polyphase winding, a second shaft having thereon the rotor of a second position measuring transformer having a stator and windings one of which is a polyphase winding, means for driving said shafts in timed relation, a source of electrical oscillations for developing coupling waves for the rotor and stator of each of said transformers, means for connecting said polyphase windings in circuit for developing an output signal as a function of the difference between the product of the speed of the first shaft and the number of cycles of coupling wave per revolution of the rotor of the first transformer and the product of the speed of the second shaft and the number of cycles of coupling wave per revolution of the rotor of the second transformer, and means responsive to said output signal for controlling the ratio of the speeds of said shafts.

10. A position measuring transformer system according to claim 9, said means for controlling the ratio of said speeds being operative to change the ratio of the speeds until said difference is substantially zero.

11. A position measuring transformer system according to claim 9 and servomotor means having an input of said output signal for controlling the timed relation of said shafts.

12. A position measuring transformer system according to claim 9, said driving means comprising a motor for driving one of said shafts, gearing through which the other shaft is driven by said motor, and a differential gear responsive to said controlling means for controlling the over-all gear ratio between said shafts.

References Cited

UNITED STATES PATENTS 3,178,663   4/1965   Kahn.

OTHER REFERENCES

Induction Principles and Applications, Farrand Controls Inc., 99 Wall St., Valhalla, N.Y., pp. 8 and 9.

ORIS L. RADER, *Primary Examiner.*

T. E. LYNCH, *Assistant Examiner.*

UNITED STATES PATENT OFFICE
CERTIFICATE OF CORRECTION

Patent No. 3,373,326                                  March 12, 1968

Clair L. Farrand

It is certified that error appears in the above identified patent and that said Letters Patent are hereby corrected as shown below:

Column 1, lines 25 through 36 should be included in the "ABSTRACT OF THE DISCLOSURE". Column 2, line 19, "speed" should read -- speeds --. Column 3, line 5, "for", first occurrence, should read -- of --. Column 5, line 18, "transformer" should read -- transformers --; line 44, after "speeds of" insert -- two --; line 64, "coupled" should read -- coupling --.

Signed and sealed this 21st day of October 1969.

(SEAL)
Attest:

Edward M. Fletcher, Jr.                            WILLIAM E. SCHUYLER, JR.
Attesting Officer                                       Commissioner of Patents